US007131588B1

(12) United States Patent
Larkin et al.

(10) Patent No.: US 7,131,588 B1
(45) Date of Patent: Nov. 7, 2006

(54) CREATION AND DECODING OF TWO-DIMENSIONAL CODE PATTERNS

(75) Inventors: Kieran Gerard Larkin, Putney (AU); Michael Alexander Oldfield, Eastwood (AU)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/550,900

(22) Filed: Apr. 17, 2000

(30) Foreign Application Priority Data

Apr. 21, 1999 (AU) ..................................... PP9920

(51) Int. Cl.
*G06K 7/10* (2006.01)

(52) U.S. Cl. .................................... 235/462.09; 235/10

(58) Field of Classification Search ........... 235/462.09, 235/462.01, 462.07, 462.1, 462.15, 462.25
See application file for complete search history.

(56) References Cited

U.S. PATENT DOCUMENTS 4,542,989 A * 9/1985 Remijan ..................... 356/616
5,003,600 A * 3/1991 Deason et al. ................ 380/54
5,477,383 A * 12/1995 Jain ........................... 359/565
5,862,260 A * 1/1999 Rhoads ....................... 382/232
6,043,870 A * 3/2000 Chen ......................... 356/35.5
6,066,949 A * 5/2000 Alley et al. ................. 324/309
6,164,552 A * 12/2000 Sato ........................... 235/494
6,571,014 B1 * 5/2003 Larkin ........................ 382/232

FOREIGN PATENT DOCUMENTS

EP 828365 3/1998
EP 868082 9/1998

OTHER PUBLICATIONS

M. Kujawinska, "5 Spatial Phase Measurement Methods", Interferogram Analysis: Digital Fringe Pattern Measurement Techniques, 1993, pp. 141-193.
Bone et al., "Fringe-pattern anaylsis using a 2-D Fourier transform", Applied Optics, May 15, 1986, vol. 25, No. 10, pp. 1653-1660.

* cited by examiner

*Primary Examiner*—Daniel Stcyr
(74) *Attorney, Agent, or Firm*—Fitzpatrick, Cella, Harper & Scinto

(57) ABSTRACT

A method of utilising a two-dimensional code pattern is disclosed comprising the steps of encoding (5) the structure of phase perturbations (including singularities) on a continuous phase map structure as an encoded representation of the code information. The codes can then be impressed or printed on other media such labels, documents, envelopes etc. A method of demodulating (10) the aforementioned codes and determining a phase map structure for the code including the detection of embedded phase singularities and decoding the embedded information, is also disclosed.

20 Claims, 6 Drawing Sheets

Grey scale representation of phase with black=zero, white = $2\pi$

CREATION AND DECODING OF TWO-DIMENSIONAL CODE PATTERNS

FIELD OF THE INVENTION

The present invention relates to two-dimensional code patterns on optical readable labels and more particularly to the generation of two-dimensional code patterns using phase modulation. A detection method of the two-dimensional codes is also presented which is direction insensitive and relies upon phase demodulation techniques. The demodulation of the codes is dependent on phase perturbations (including singularities) embedded in the code pattern.

DESCRIPTION OF BACKGROUND ART

Known arrangements for encoding information on labels (or other items) use one-dimensional codes with a binary optical pattern. An example thereof is the so-called "barcode" or Universal Product Code (UPC) used to identify products at the point of sale or used for inventory control purposes. Binary optical patterns allow only two possible reflectance values. Such arrangements typically make use of a white background and black printed markings in a required pattern, representing binary "0" and "1" respectively. The information is encoded in the widths and frequency of the black lines on the white background.

More recently, in order to increase the data density and/or reduce the label sizes used, two-dimensional codes were developed. However, most of these arrangements were mere two-dimensional embodiments of the one-dimensional codes in that they also make use of binary optical patterns. These arrangements utilise patterns of black dots or squares/rectangles instead of lines on a white background.

SUMMARY OF THE INVENTION

It is an object of the present invention to substantially overcome, or at least ameliorate, one or more of the deficiencies of the above mentioned arrangements.

In accordance with a first aspect of the present invention, there is provided a method of encoding information into a two-dimensional code pattern, the method comprising the steps of: inputting information to be encoded; generating a phase perturbation pattern utilizing one or more phase spirals encoding the inputted information; and creating an artificial two-dimensional code pattern by phase modulating a two-dimensional spatial carrier with the phase perturbation pattern.

In accordance with a second aspect of the present invention, there is provided a method of decoding information from an artificial two-dimensional code pattern, the method comprising the steps of: providing a two-dimensional spatial carrier that is known to match that used to create the two-dimensional code pattern; detecting phase perturbations of said two-dimensional spatial carrier in the two-dimensional code pattern, the phase perturbations comprising one or more phase spirals; and decoding the information from the phase spirals.

BRIEF DESCRIPTION OF THE DRAWINGS

A preferred embodiment of the present invention is described hereinafter with reference to the drawings in which.

DESCRIPTION OF PREFERRED AND OTHER EMBODIMENTS

Figure 1:
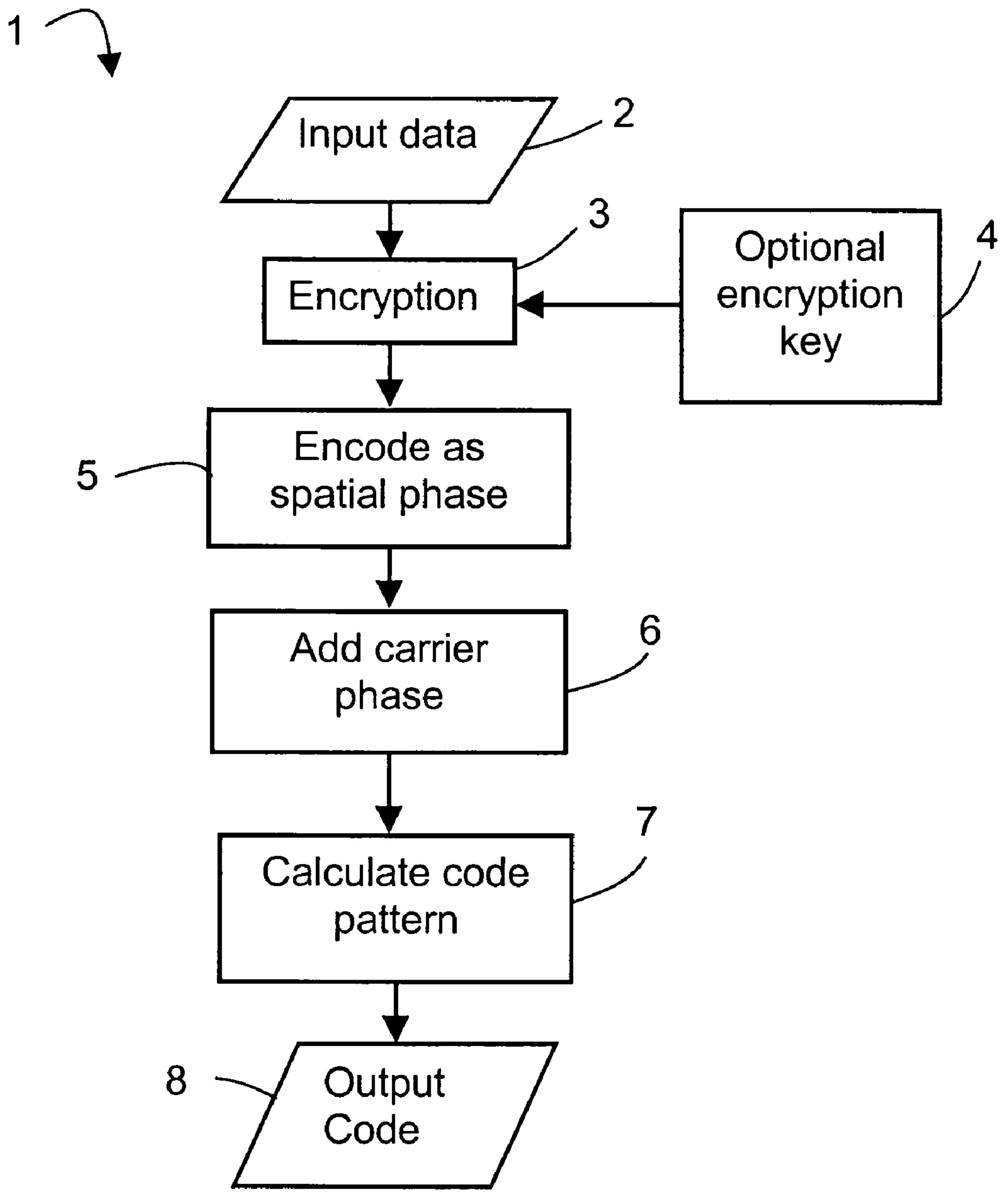
FIG. 1 illustrates a flow chart of the generation steps of the preferred embodiment.

The preferred embodiment can be understood through a number of important initial observations in respect of fringe pattern analysis.

AM/FM communication waveforms are one-dimensional (ID) fringe patterns. Whenever a signal is not in a form suitable for transmission over a chosen or convenient medium e.g., a low frequency signal is difficult to transmit and receive with compact antennae), an underlying high frequency wave (called a carrier) is modulated in frequency (FM) or amplitude (AM) by the signal. The purpose of the carrier is to translate the signal's frequency components to a higher frequency, the higher frequency being able to propagate through the medium. For example, properties of a radio frequency carrier are varied in proportion to the low frequency signal, allowing propagation through space.

The situation is similar for 2D fringe patterns. Properties of a slowly varying pattern may be difficult to detect and are susceptible to noise. By phase modulation of a spatial fringe pattern as carrier with an appropriate underlying frequency with the slowly varying pattern, the properties of the slowly varying pattern can be detected with higher accuracy and also with higher resistance to noise.

The preferred embodiment of the invention harnesses these various observations in the production of an effective two-dimensional code pattern. Advantageously, the code pattern can be represented by the following equation:

$$f(x, y)=a(x, y)+b(x, y)\cos(\phi(x, y))+n(x, y) \qquad \text{Equation (1)}$$

Where f(x, y) represents the intensity of the code pattern, consisting of 4 main terms. Position coordinates (x, y) can be continuous for an analog pattern or discrete for digital patterns. A slowly varying background level is denoted by a(x, y) while an amplitude modulation term is denoted by b(x, y). In the preferred embodiment of code pattern generation, both a(x, y) and b(x, y) are maintained near constant levels. Therefore, the information carrying term is $\phi(x, y)$, which represents the phase of the fringe pattern. The remaining term is called the noise n(x, y) and contains random and systematic error components encountered with real code patterns. Noise n(x, y) contributes no useful information to the pattern, but is present because of the occurrence of blurring, non linearities, quantisation errors, smudging, scratches, cuts, dust, etc.

An idealised (normalised) code pattern can be represented in a simplified form by the first two terms in equation (1) with: $a \equiv b \equiv 1$, i.e.:

$$f(x, y)=1+\cos(\phi(x, y)) \qquad \text{Equation (2)}$$

It is noted that although phase function $\phi(x, y)$ is (generally) a slowly varying function of position (x, y), the code pattern intensity f(x, y) is (generally) a rapidly varying function of (x, y).

In practice, the phase function $\phi(x, y)$ can be chosen to simplify the demodulation process. In the simplest case:

$$\phi(x, y)=2\pi(u_0x+v_0y)+\Psi(x, y) \quad \text{Equation (3)}$$

where $u_o$ and $v_o$ are constants, making the carrier a linear function of x and y. The information is retained in a additional term $\Psi(x, y)$. This case is analogous to plane wave modulation used in holography. The demodulation in this case is relatively straightforward and can be performed by using a Hilbert transform based demodulation, or a small kernel estimator of the local frequency, or related methods. An example of the Hilbert transform can be found in D. J. Bone, H.-A. Bachor, and R. J. Sandeman, "Fringe-pattern analysis using a 2-D Fourier transform," Applied Optics 25, (10), 1653–1660, (1986).

The preferred embodiment makes use of a circular or "conical phase" carrier. The carrier has circular symmetry and a local gradient with constant magnitude but varying direction:

$$\left.\begin{aligned} \phi(x, y) &= 2\pi w_0 r + \psi(x, y)) \\ r^2 &= x^2 + y^2 \end{aligned}\right\} \quad \text{Equation (4)}$$

where $w_o$ is a constant. In alternate embodiments, alternate carrier functions like elliptical or parabolical carriers can be used.

The demodulation can be performed using any one of a variety of methods to estimate the local frequency. However, the Fourier space Hilbert method is no longer directly applicable. A modified Hilbert method can be used. The modification allows a block-based (or local) Hilbert transform to demodulate regions of a code pattern with smaller variations in fringe angle than the Fourier space Hilbert method allows.

The preferred embodiment for demodulation uses compact kernel algorithms for spatial carrier demodulation methods such as those disclosed in M. Kujawinska, "Spatial Phase Measurement Methods" in Interferogram Analysis: Digital Fringe Pattern Measurement Techniques, D. W. Robinson and G. T. Reid, eds (Institute of Physics, Bristol, U.K. 1993). There are many algorithms that can be used, both one-dimensional and two-dimensional. Methods such as the Fourier (Hilbert) Transform Method can also be used.

In the preferred embodiment a simple two-dimensional adaptive demodulator is chosen, but other algorithms can be chosen to suit the characteristics of the data. For example, if there are harmonics present in the signal due to non linearities then specially adapted algorithms, insensitive to these harmonics, may be utilized.

The two-dimensional code pattern can be represented as a basic fringe pattern:

$$f_b(x, y)=a(x, y)+b(x, y)\cos(\phi(x, y)) \quad \text{Equation (5)}$$

The observation that the spacing in the fringe pattern is near-constant can be written mathematically as the phase derivative (or frequency) having two components, one of which has a constant magnitude $\sigma$, i.e.

$$\phi(x, y)=2\pi(ux+vy)+\Psi \quad \text{Equation (6)}$$

and $$u^2+v^2=\sigma^2 \quad \text{Equation (7)}$$

The nominal orientation of the fringe is defined by the angle $\beta$, where:

$$\tan\beta = \frac{v}{u} \quad \text{Equation (8)}$$

The objective of demodulation is to recover the phase function $\phi(x, y)$ from the fringe pattern $f_b$. Conventional spatial carrier phase-shifting algorithms can demodulate the phase over a small range of frequencies (phase derivative). However, the code pattern represents a fringe pattern which has x and y components of frequency which vary over a wide range. A useable demodulation algorithm must be able to adapt to the fringe pattern.

A convenient algorithm can be based upon a five sample non-linear phase-shifting algorithm. Consider five successive samples of the digitised code pattern:

$$I_{-2}=f_b(x-2, y)$$

$$I_{-1}=f_b(x-1, y)$$

$$I_0=f_b(x, y)$$

$$I_{+1}=f_b(x+1, y)$$

$$I_{+2}=f_b(x+2, y) \quad \text{Equation (9)}$$

Symmetrically filtered components are defined as follows:

$$c_1=-I_{-1}+2I_0-I_{+1}$$

$$c_2=-I_{-2}+2I_0-I_{+2}$$

$$s_1=-I_{-1}+I_{+1}$$

$$s_2=-I_{-2}+I_{+2} \quad \text{Equation (10)}$$

The phase, modulation and frequency parameters can now be extracted. The preferred embodiment makes use of a robust estimator, avoiding zero-by-zero division, for fringe patterns with more than 3 pixels per fringe:

$$\alpha = 2\arccos\left\{\frac{1}{2}\sqrt[4]{\frac{(2s_1+s_2)^2+c_2^2}{s_1^2+c_1^2}}\right\} \quad \text{Equation (11)}$$

Thus, the actual phase can be recovered in a number of ways. One method integrates a with respect to x to get $\phi$. In general, this can be combined with a corresponding y integration to get all components of $\phi$. An alternative is to substitute Equation (11) back into Equations (5) and (9) to get:

$$b\sin(\phi) = -\frac{sgn(s_1)}{4\sin(\alpha)}\sqrt{\frac{s_2^2+4s_1^2}{1+\cos^2(\alpha)}} \text{ and} \quad \text{Equation (12)}$$

$$b\cos(\phi) = \frac{c_2+4_{c_1}}{16\sin^2(\alpha/2)[1+\cos^2(\alpha/2)]} \text{ so} \quad \text{Equation (13)}$$

$$\tan(\phi) = \frac{b\sin(\phi)}{b\cos(\phi)} \quad \text{Equation (14)}$$

Additional features, such as borders and/or reticular marks, can be added to the basic code pattern to facilitate alignment and calibration of the detection system where necessary.

Once the basic demodulation is complete it is possible to remove the carrier phase by subtraction of a linear (planar) or conical phase term. In practice this is not explicitly necessary if phase spirals are used as the phase pertubations making up the term Ψ(x, y). Phase spirals have a special property which allows them to be detected in the presence of any locally smooth background phase, such as planar or conical phase.

An array of phase spirals can be expressed as:

$$\Psi(x, y) = \sum_n S_n \cdot \tan^{-1}\left(\frac{y - y_n}{x - x_n}\right) \qquad \text{Equation (15)}$$

wherein $S_n$ is the spiral charge and $(x_n, y_n)$ is the spiral locations.

A variety of methods can be used for the spiral phase detection, such as:

Correlation with a spiral phase kernel

Estimation of the local gradient of the phase function

Estimation of the phase change around a loop of pixels around the pixel of interest.

All the above methods can estimate a local phase spiral "charge" and location. A charge of zero indicates a spiral is absent. Spiral charges of ±1 are useful for binary encoding. Once the spirals are detected the spatial pattern can be decoded.

Turning now to FIG. 1 there is shown in more detail the main steps of generating the two-dimensional code pattern in accordance with the preferred embodiment. The proposed method 1 starts with input data in step 2. This data is typically an ASCII string. An optional encryption step 3 can be utilised, whereby the input data 2 is encrypted using an encryption key 4. Because the method is not dependent on the content of the input data 2, and the fact that encryption will merely alter the input data content and not its format, the discussion of the preferred embodiment will assume no encryption. The input data 2 is encoded into a spatial phase function Ψ(x,y) in step 5. For example, a ASCII string "qpQfFUR1", can be denoted as:

$$\psi = \begin{matrix} +1 & -1 & -1 & -1 & +1 & +1 & +1 & -1 \\ +1 & -1 & -1 & -1 & +1 & +1 & +1 & +1 \\ +1 & -1 & +1 & -1 & +1 & +1 & +1 & -1 \\ +1 & -1 & -1 & +1 & +1 & -1 & -1 & +1 \\ +1 & -1 & +1 & +1 & +1 & -1 & -1 & +1 \\ +1 & -1 & +1 & -1 & +1 & -1 & +1 & -1 \\ +1 & -1 & +1 & -1 & +1 & +1 & -1 & +1 \\ +1 & -1 & -1 & +1 & -1 & -1 & +1 & +1 \end{matrix}$$

In the above example the ASCII string was first converted to binary code. Thereafter, a binary "0" was represented as a +1, whereas a binary "1" was represented as a "−1". The spatial phase Ψ(x, y) is added to a carrier phase component using Equation (4). This results in a phase term ϕ(x, y). The phase term ϕ(x, y) can be used in Equation (2) to generate a code pattern f(x, y) in step 7.

Figure 2A:
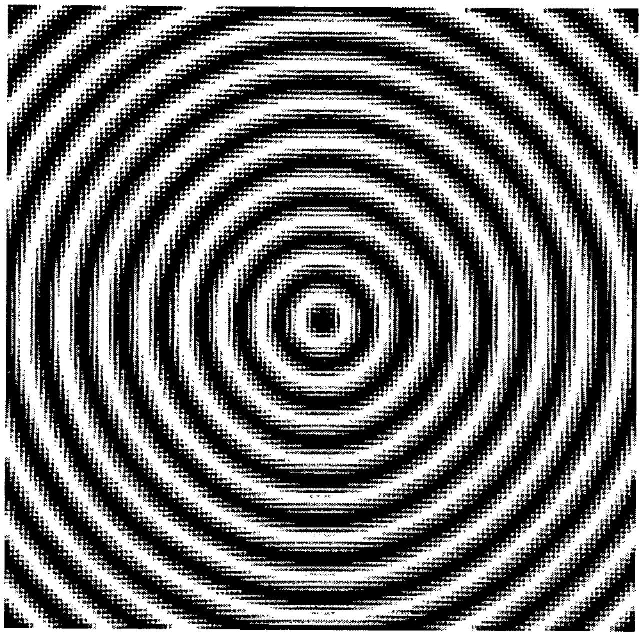
FIG. 2*a* shows a spatial phase with no code pattern added to a carrier.
Figure 2B:
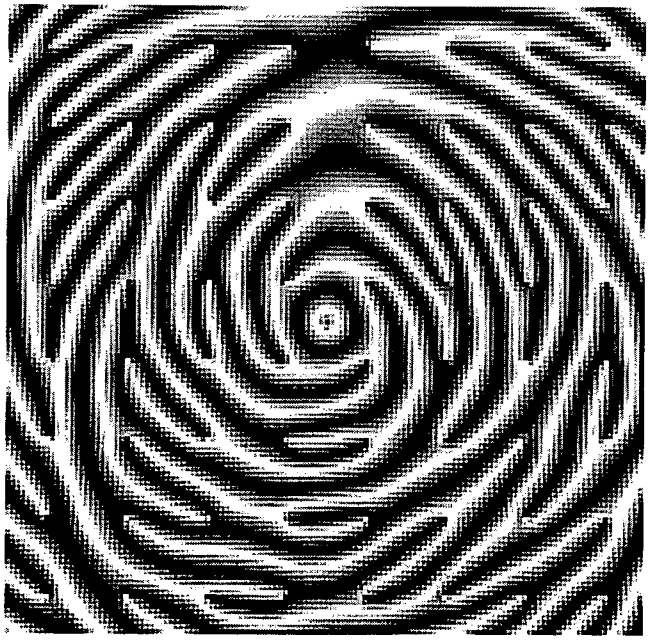
FIG. 2*b* shows an example of synthetically created code pattern.

The code pattern f(x, y) can be printed in step 8 using a conventional laser printer. A code pattern with no spatial phase added to the carrier is shown in FIG. 2*a*. However, after phase modulation with the spatial phase of the above example, the code pattern as shown in FIG. 2*b* is created.

Figure 3:
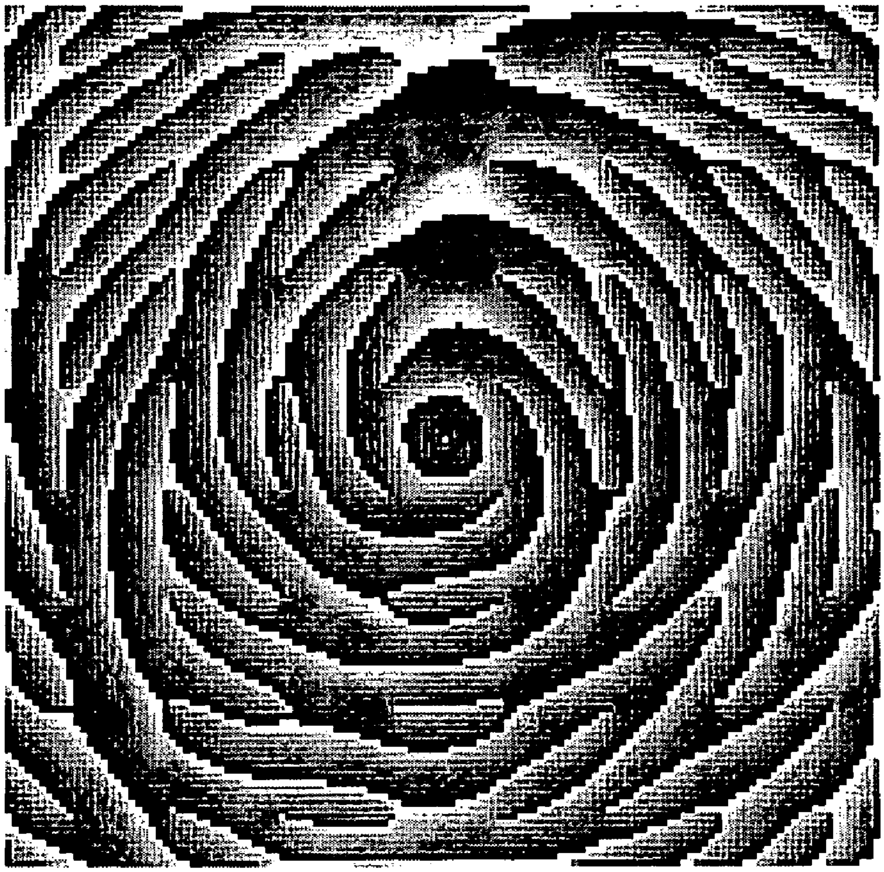
FIG. 3 illustrates a phase map of the "code" of FIG. 2*b;*

In FIG. 3 the phase function ϕ(x, y) is illustrated with zero phase as black, 2π as white, and values in between being a corresponding intensity of grey.

Figure 4:
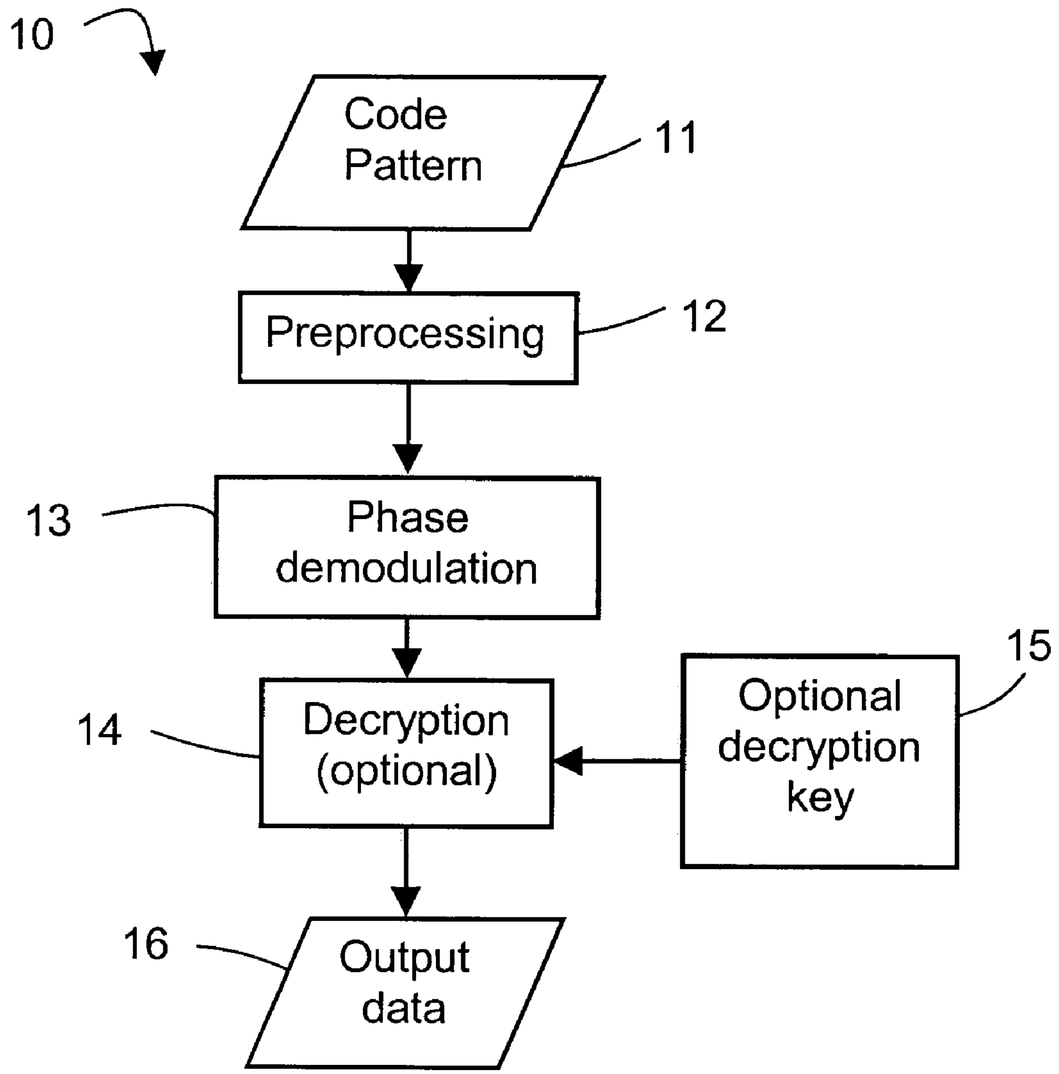
FIG. 4 illustrates a flow chart of the demodulation steps of the preferred embodiment.

The demodulation process 10 is illustrated in FIG. 4. The first step of the demodulation process 10 is to input the code pattern 11. This can be a digital scan from a previously printed code.

A preprocessing step 12 is preferably utilised to remove gross pattern defects such as smearing or over-inking. For the purposes of discussion of the preferred embodiment, a relatively high quality pattern from an optical input device is assumed.

Figure 6:
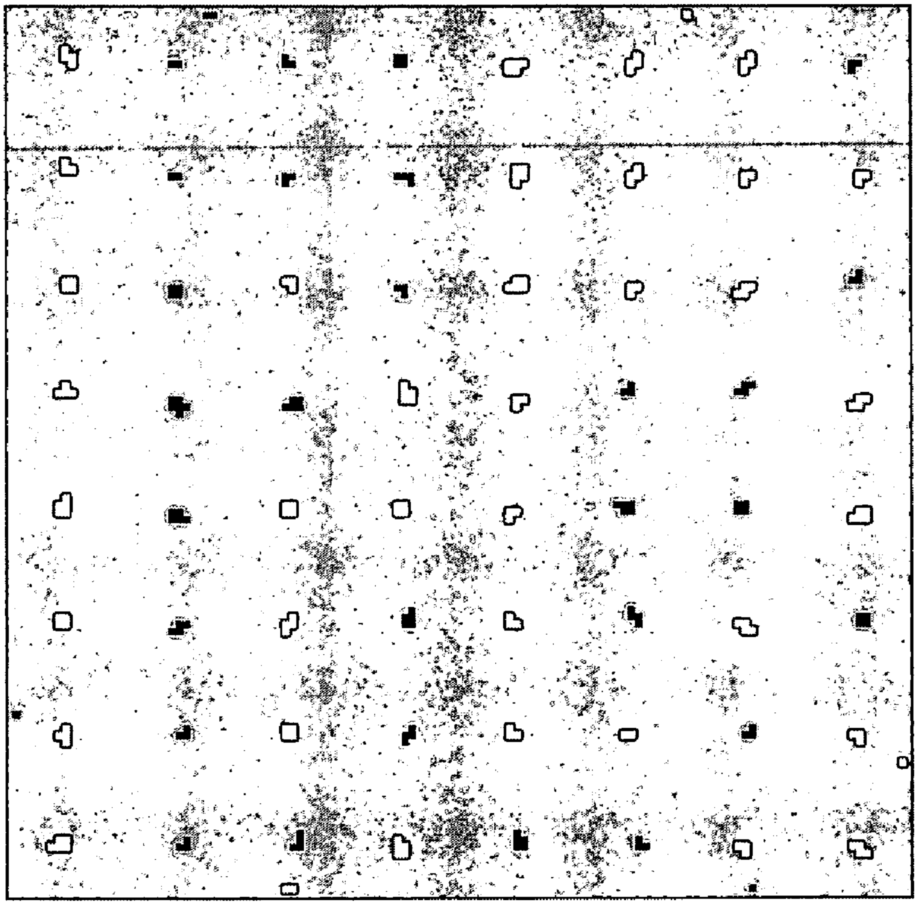
FIG. 6 illustrates a grey scale representation of detected spatial locations and their values.

The demodulation step 13 is to recover the spatial phase term Ψ(x, y) by extracting the phase term ϕ(x, y) from the code pattern f(x, y). FIG. 6 illustrates a grey scale representation of detected spatial locations and their values, wherein black is representing a "−1" and white is representing a "+1". Grey indicates that no phase modulation was detected at that location. As before, "−1" is decoded as a binary one, whereas "+1" is decoded as a binary "0". Decoding FIG. 6 once again produces the ASCII string "qpQfFUR1".

The preferred embodiment of the present invention can be implemented as a computer application program using a conventional general-purpose computer system, such as the computer system 100 shown in FIG. 5, in which the application program described with reference to the other drawings is implemented as software executed on the computer system 100. The computer system 100 includes a computer module 102, an input devices such as a keyboard 110 and mouse 112, and output devices including a printer device 108 and a display device 104.

The computer module 102 typically includes at least one processor unit 114, a memory unit 118, for example formed from semiconductor random access memory (RAM) and read only memory (ROM). A number of input/output (I/O) interfaces including a video interface 122, and an I/O interface 116 for the keyboard 110 and mouse 112 are also included. A storage device 124 is provided and typically includes a hard disk drive 126 and a floppy disk drive 128. The components 114 to 128 of the computer module 102, typically communicate via an interconnected bus 130 and in a manner which results in a conventional mode of operation of the computer system 100 known to those in the relevant art. Examples of computers on which the embodiments can be practised include IBM-PC's and compatibles, or alike computer systems evolved therefrom. Typically, the application program of the preferred embodiment is resident on the hard disk drive 126 and read and executed using the processor 114. Intermediate storage of the program and any data processed may be accomplished using the semiconductor memory 118, possibly in concert with the hard disk drive 126. In some instances, the application program may be supplied to the user encoded on a floppy disk.

The code pattern generation and demodulation methods described with reference to FIGS. 1 and 4 are performed in accordance with instructions contained in the software.

In an alternative embodiment, the present invention can be implemented in dedicated hardware such as one or more integrated circuits. Such dedicated hardware may include graphic processors, digital signal processors, or one or more microprocessors and associated memories.

The foregoing only describes some embodiments of the present invention, and modifications, can be made thereto without departing from the scope of the present invention.

The invention claimed is:

1. A method of encoding information into a two-dimensional code pattern, the method comprising the steps of:

inputting the information to be encoded;

generating a phase perturbation pattern utilizing one or more phase spirals encoding the inputted information; and creating an artificial two-dimensional code pattern by phase modulating a two-dimensional spatial carrier with the phase perturbation pattern.

2. The method as set out in claim 1, wherein the two-dimensional code pattern is in the form:

$$f(x,y)=a(x,y)+b(x,y)\cos(\phi(x,y))$$

wherein a(x,y) is a background intensity level, b(x,y) is an amplitude modulation term, and $\phi$(x,y) is a phase of the phase-modulated two-dimensional spatial carrier.

3. The method as set out in claim 2, wherein the phase is a two-dimensional polynomial function of the phase perturbation pattern.

4. The method as set out in claim 2, wherein the phase is in the form:

$$\left.\begin{array}{l}\phi(x,y)=2\pi\omega_0 r+\psi(x,y)\\ r^2=x^2=y^2\end{array}\right\}$$

wherein $\Psi$(x,y) is the phase perturbation pattern.

5. The method as set out in claim 4, wherein the phase perturbation pattern is in the form:

$$\psi(x,y)=\sum_n S_n\tan^{-1}\left(\frac{y-y_n}{x-x_n}\right)$$

wherein $S_n$ is a spiral charge and $(x_n,y_n)$ are spiral locations in the phase perturbation pattern.

6. The method as claimed in claim 1, wherein the information is a sequence of integers.

7. The method as claimed in claim 1, wherein the information is a binary sequence.

8. A method of decoding information from an artificial two-dimensional code pattern, said method comprising the steps of:

providing a two-dimensional spatial carrier that is known to match that used to create the two-dimensional code pattern;

detecting phase perturbations of the two-dimensional spatial carrier in the two-dimensional code pattern, the phase perturbations comprising one or more phase spirals; and decoding the information from the phase spirals.

9. The method as set out in claim 8, wherein the two-dimensional code pattern is in the form:

$$f(x,y)=a(x,y)+b(x,y)\cos(\phi(x,y))+n(x,y)$$

wherein n(x,y) is random noise;

a(x,y) is background intensity level;

b(x,y) is an amplitude modulation term; and $\phi$(x, y) is a phase of a carrier pattern with perturbations.

10. Apparatus for encoding information into a two-dimensional code pattern, said apparatus comprising:

means for inputting information to be encoded;

means for generating a phase perturbation pattern utilizing one or more phase spirals encoding the inputted information; and means for creating an artificial two-dimensional code pattern by phase modulating a two-dimensional spatial carrier with the phase perturbation pattern.

11. The apparatus as set out in claim 10, wherein the two-dimensional code pattern is in the form:

$$f(x,y)=a(x,y)+b(x,y)\cos(\phi(x,y))$$

wherein a(x,y) is a background intensity level, b(x,y) is an amplitude modulation term, and $\phi$(x, y) is a phase of the phase modulated two-dimensional spatial carrier.

12. The apparatus as set out in claim 11, wherein the phase is a two-dimensional polynomial function of the phase perturbation pattern.

13. The apparatus as set out in claim 11, wherein the phase is in the form:

$$\left.\begin{array}{l}\phi(x,y)=2\pi\omega_0 r+\psi(x,y)\\ r^2=x^2=y^2\end{array}\right\}$$

wherein $\Psi$(x,y) is the phase perturbation pattern.

14. The apparatus as set out in claim 13, wherein the phase perturbation pattern is in the form:

$$\psi(x,y)=\sum_n S_n\tan^{-1}\left(\frac{y-y_n}{x-x_n}\right)$$

wherein $S_n$ is a spiral charge and $(x_n,y_n)$ are spiral locations in said phase perturbation pattern.

15. The apparatus as claimed in claim 10, wherein the information is a sequence of integers.

16. The apparatus as claimed in claim 10, wherein the information is a binary sequence.

17. Apparatus of decoding a sequence of integers from an artificial two-dimensional code pattern, said apparatus comprising:

means for providing a two-dimensional spatial carrier that is known to match that used to create the two-dimensional code pattern;

means for detecting phase perturbations of the two-dimensional spatial carrier in the two-dimensional code pattern, the phase perturbations comprising one or more phase spirals; and means for decoding the sequence from the phase spirals.

18. The apparatus as set out in claim 17, wherein the two-dimensional code pattern is in the form:

$$f(x,y)=a(x,y)+b(x,y)\cos(\phi(x,y))+n(x,y)$$

wherein n(x y) is random noise;

a(x,y) is background intensity level;

b(x,y) is an amplitude modulation term; and $\phi$(x, y) is a phase of a carrier pattern with perturbations.

19. A computer program product including a computer readable medium incorporating a computer program for encoding information into a two-dimensional code pattern, said computer program product comprising:

means for inputting information to be encoded;

means for generating a phase perturbation pattern utilizing one or more phase spirals encoding the inputted information;

means for creating an artificial two-dimensional code pattern by phase modulating a two-dimensional spatial carrier with the phase perturbation pattern; and means for sending instructions to a printer for marking a label with the artificial two-dimensional code pattern.

20. A computer program product including a computer readable medium incorporating a computer program for decoding information from an artificial two-dimensional code pattern, said computer program product comprising:

means for providing a two-dimensional spatial carrier that is known to match that used to create the two-dimensional code pattern;

means for detecting phase perturbations of the two-dimensional spatial carrier in the two-dimensional code pattern, the phase perturbations comprising one or more phase spirals; and means for decoding the information from the phase spirals.

* * * * *

UNITED STATES PATENT AND TRADEMARK OFFICE

CERTIFICATE OF CORRECTION

PATENT NO. : 7,131,588 B1
APPLICATION NO. : 09/550900
DATED : November 7, 2006
INVENTOR(S) : Kieran Gerard Larkin et al.

It is certified that error appears in the above-identified patent and that said Letters Patent is hereby corrected as shown below:

COLUMN 2:

Line 22, "e.g.," should read --(e.g.,--; and
Line 57, "non linearities" should read --nonlinearities,--.

COLUMN 3:

Line 6, "a" should read --an--;
Line 23, "ψ(x,y))" should read --ψ(x,y)--; and
Line 51, "non lineari-" should read --nonlineari- --.

COLUMN 4:

Line 47, "integrates a" should read --integrates α--.

COLUMN 6:

Line 31, "devices" should read --device--; and
Line 66, "modifications," should read --modifications--.

COLUMN 7:

Line 25, " $\left.\begin{array}{l}\phi(x,y)=2\pi\omega_0 r+\psi(x,y)\\ r^2=x^2=y^2\end{array}\right\}$ " should read -- $\left.\begin{array}{l}\phi(x,y)=2\pi\omega_0 r+\psi(x,y)\\ r^2=x^2+y^2\end{array}\right\}$ --.

COLUMN 8:

Line 21, " $\left.\begin{array}{l}\phi(x,y)=2\pi\omega_0 r+\psi(x,y)\\ r^2=x^2=y^2\end{array}\right\}$ " should read -- $\left.\begin{array}{l}\phi(x,y)=2\pi\omega_0 r+\psi(x,y)\\ r^2=x^2+y^2\end{array}\right\}$ --.

UNITED STATES PATENT AND TRADEMARK OFFICE
CERTIFICATE OF CORRECTION

PATENT NO. : 7,131,588 B1
APPLICATION NO. : 09/550900
DATED : November 7, 2006
INVENTOR(S) : Kieran Gerard Larkin et al.

Figure 5:
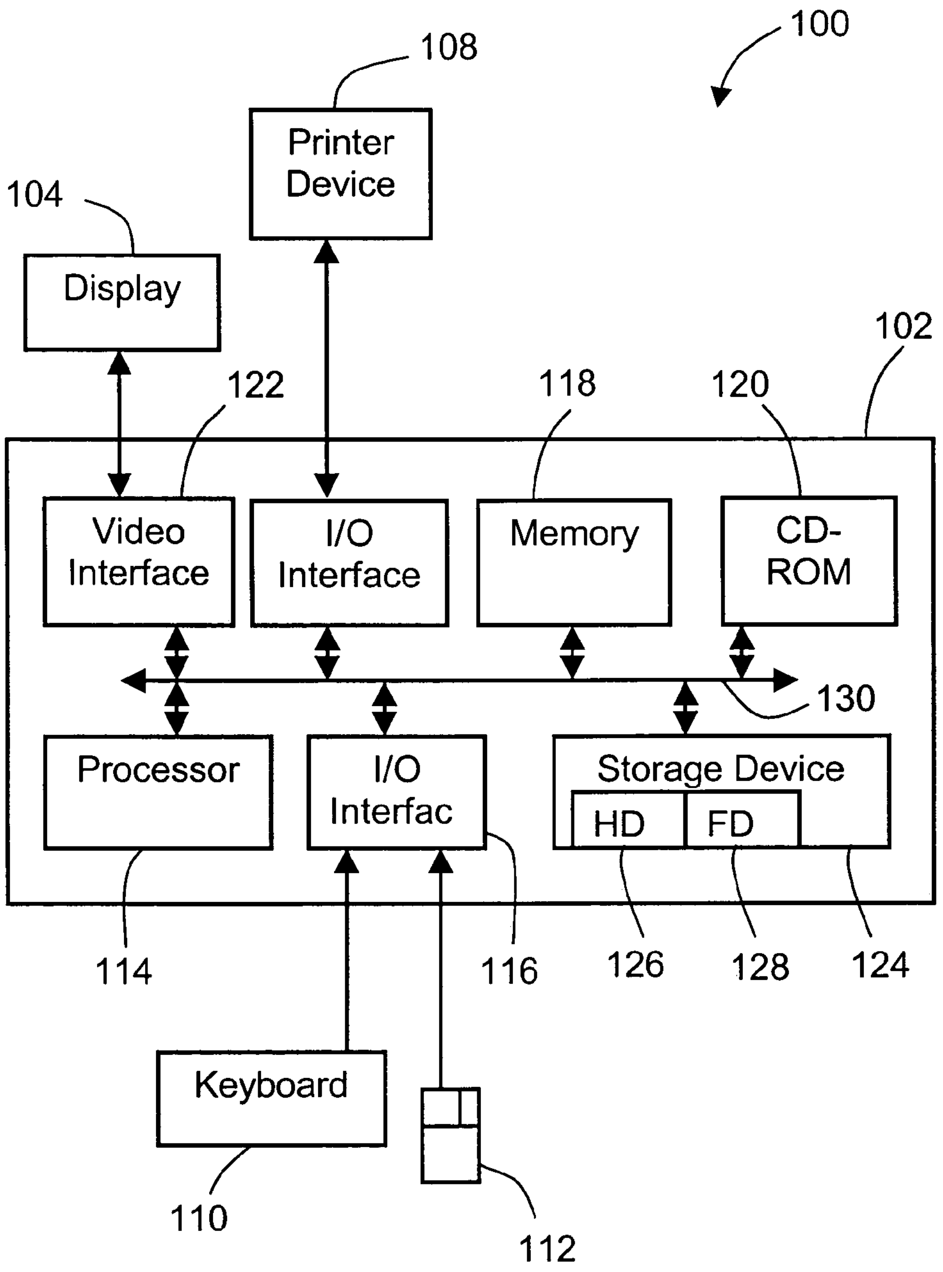
FIG. 5 is a schematic block diagram of a general-purpose computer upon which the preferred embodiment of the present invention can be practiced.

It is certified that error appears in the above-identified patent and that said Letters Patent is hereby corrected as shown below:

<u>SHEET 5</u>:

Figure 5, "I/O Interfac" should read --I/O Interface--.

Signed and Sealed this

Nineteenth Day of June, 2007

JON W. DUDAS
*Director of the United States Patent and Trademark Office*